United States Patent
Lam et al.

(10) Patent No.: US 8,077,080 B2
(45) Date of Patent: Dec. 13, 2011

(54) CALIBRATION TO IMPROVE WEATHER RADAR POSITIONING DETERMINATION

(75) Inventors: David Y. Lam, Mukilteo, WA (US); Walter Niewiadomski, Kirkland, WA (US); Steve Mowry, Duvall, WA (US); Eric Klingler, Monroe, WA (US)

(73) Assignee: Honeywell International Inc., Morristown, NJ (US)

( * ) Notice: Subject to any disclaimer, the term of this patent is extended or adjusted under 35 U.S.C. 154(b) by 450 days.

(21) Appl. No.: 12/405,924

(22) Filed: Mar. 17, 2009

(65) Prior Publication Data

US 2010/0241381 A1    Sep. 23, 2010

(51) Int. Cl.
G01S 7/40 (2006.01)
(52) U.S. Cl. ............... 342/174; 342/165; 702/86
(58) Field of Classification Search .............. 342/174
See application file for complete search history.

(56) References Cited

U.S. PATENT DOCUMENTS

| | | | |
|---|---|---|---|
| H104 H | 8/1986 | Hung et al. | |
| 4,911,385 A * | 3/1990 | Agrawal et al. | 244/165 |
| 5,557,285 A * | 9/1996 | Bender et al. | 342/359 |
| 6,538,602 B2 * | 3/2003 | Natsume et al. | 342/359 |
| 6,816,112 B1 * | 11/2004 | Chethik | 342/357.31 |
| 7,095,376 B1 * | 8/2006 | Timothy et al. | 343/705 |
| 7,199,749 B2 | 4/2007 | Greneker, III et al. | |
| 7,256,411 B2 | 8/2007 | Mizes et al. | |
| 7,333,064 B1 * | 2/2008 | Timothy et al. | 343/705 |
| 2003/0075641 A1 | 4/2003 | Klesadt et al. | |
| 2006/0097108 A1 * | 5/2006 | Liu et al. | 244/79 |
| 2008/0129242 A1 * | 6/2008 | Liu et al. | 318/605 |

FOREIGN PATENT DOCUMENTS

| | | |
|---|---|---|
| CN | 101216333 A | 7/2008 |
| DE | 10233155 A1 | 2/2004 |

OTHER PUBLICATIONS

Xianqin Wang et al. "A Simple Based on DSP Antenna Controller of Weather Radar." Radar, 2001 CIE International Conference on, Procedings Oct. 15-18, 2001, Piscataway, NJ, IEEE, Oct. 15, 2001, pp. 1071-1074, XPO10578000 ISBN: 978-0-7803-7000-5.

* cited by examiner

*Primary Examiner* — John Sotomayor
*Assistant Examiner* — Matthew M Barker
(74) *Attorney, Agent, or Firm* — Lowe Graham Jones PLLC

(57) ABSTRACT

A method of calibrating antenna-position detection associated with a radar system, the radar system including a first gimbal and a first angle sensor configured to detect an angular position of the first gimbal, includes mounting a second angle sensor to the first gimbal configured to detect an angular position of the first gimbal. The first gimbal is rotated through each angular position of a set of the angular positions. A first set of data is generated with the first angle sensor that characterizes a detected angular position of the first gimbal. A second set of data is generated with the second angle sensor that characterizes a detected angular position of the first gimbal. A third data set is determined comprising differences, between the first and second data sets, in detected angular position at each first-gimbal angular position. The third data set is stored in a memory device.

13 Claims, 5 Drawing Sheets

CALIBRATION TO IMPROVE WEATHER RADAR POSITIONING DETERMINATION

BACKGROUND OF THE INVENTION

Most weather-radar precision performance is affected by the quality of the angular sensor (e.g., resolver) used to determine pointing accuracy of an antenna sensor oriented by one or more gimbals, for example, to which the antenna sensor is attached. FIG. 1 illustrates an exemplary dual-axis radar-scanning assembly 10. The assembly 10 includes a base member 20 supporting a first gimbal 30, which rotates about an axis x, and a second gimbal 40, which rotates about an axis y generally perpendicular to axis x. A frame 50, which is configured to support an antenna sensor (not shown in FIG. 1), may be mounted to the first gimbal 30, so as to be rotated in a two-dimensional scan field by the gimbals 30, 40. The assembly may include one or more resolvers (not shown in FIG. 1) functioning to provide signals indicating the angular position of the gimbals 30, 40.

As a consequence of the angular sensor used and its inherent precision, or lack thereof, the reported position has a defined amount of error associated with it. High-precision angular sensors are very costly and would impact the unit cost and marketability of the radar system. Moreover, simple calibration procedures, such as using a digital protractor, have been used to define the zero position (boresight) of a single-axis or multiple-axes antenna-gimbal assembly. This is a one-point calibration approach that typically does not provide a sufficient level of calibration accuracy. As such, it would be advantageous to use lower-cost sensors, with their typically lower-precision capability, with high-precision results.

SUMMARY OF THE INVENTION

In an embodiment, a method of calibrating antenna-position detection associated with a radar system, the radar system including a first gimbal and a first angle sensor configured to detect an angular position of the first gimbal, includes mounting a second angle sensor to the first gimbal configured to detect an angular position of the first gimbal. The first gimbal is rotated through each angular position of a set of the angular positions. A first set of data is generated with the first angle sensor that characterizes a detected angular position of the first gimbal. A second set of data is generated with the second angle sensor that characterizes a detected angular position of the first gimbal. A third data set is determined comprising differences, between the first and second data sets, in detected angular position at each first-gimbal angular position. The third data set is stored in a memory device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In an embodiment, to attain improved precision of a weather radar system without the added costs of high precision sensors, the lesser precision sensor is "characterized" with a higher precision sensor, the resultant data is stored onboard the radar system (e.g., in a database) and the data is used to improve the system level precision. Sensor construction and assembly in a higher-level system dictate the level of precision the sensor is capable of. These effects are typically repeatable throughout the scan region of the radar antenna. Where a repeatable error exists, a higher precision sensor would be able to measure that error throughout the scan region and the data representing such error stored for later use. In an embodiment, an encoder, of a higher precision, is used to measure the error of the resolvers used in the antenna positioner. The encoder measures error during calibration of the antenna scanning assembly to provide data that can be used onboard the radar system to compensate for the error, so as to provide onboard a true orientation of the resolvers, as measured during calibration, in relation to the erroneous orientation reported onboard by the resolvers.

An embodiment includes a method of improving position-control accuracy of a weather-radar antenna control system through calibration. An embodiment includes a calibration system, used to characterize the target system, and associated software components required to download and apply calibration data in the target system. The target system, calibration system and software components provide a method of improving system performance by compensating for deterministic position feedback error introduced by, for example, structural elements and position feedback sensors.

Figure 1:
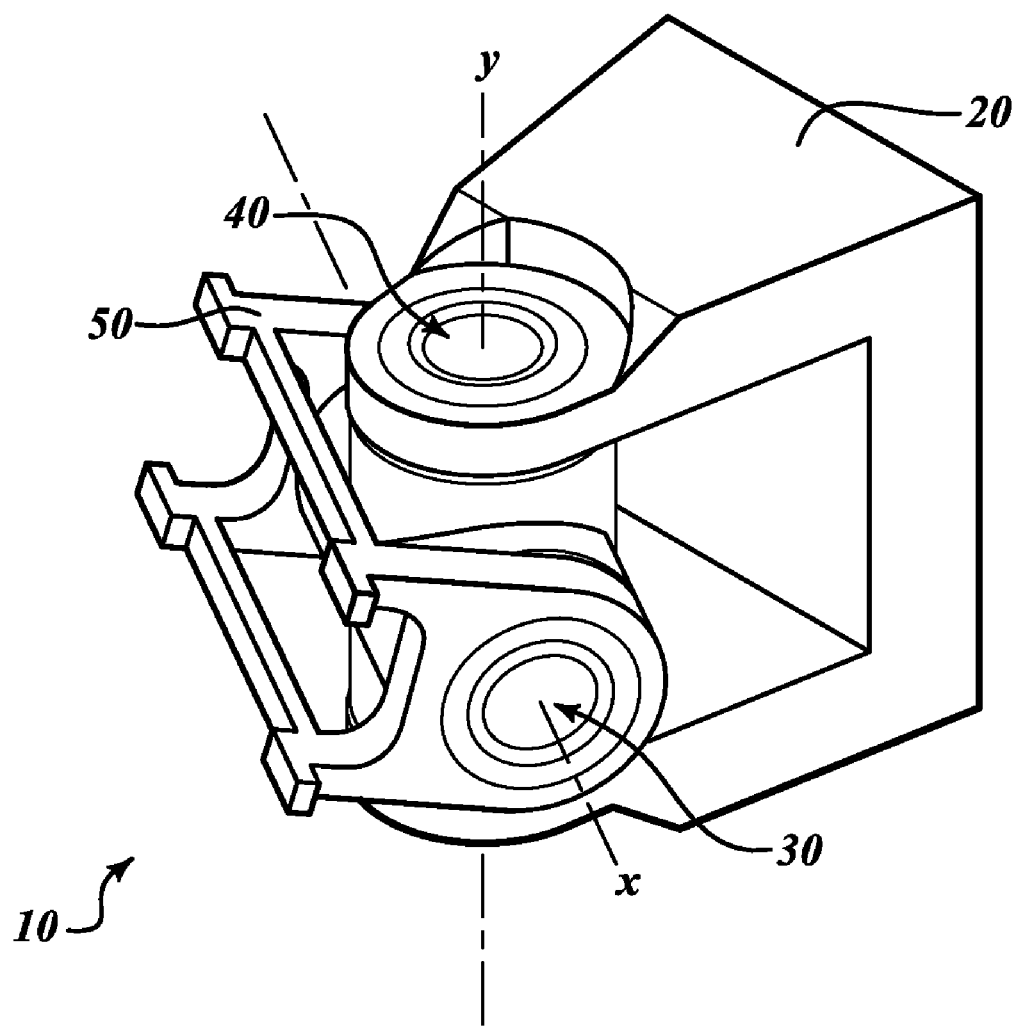
FIG. 1 illustrates an exemplary conventional dual-axis radar-scanning assembly.
Figure 2:
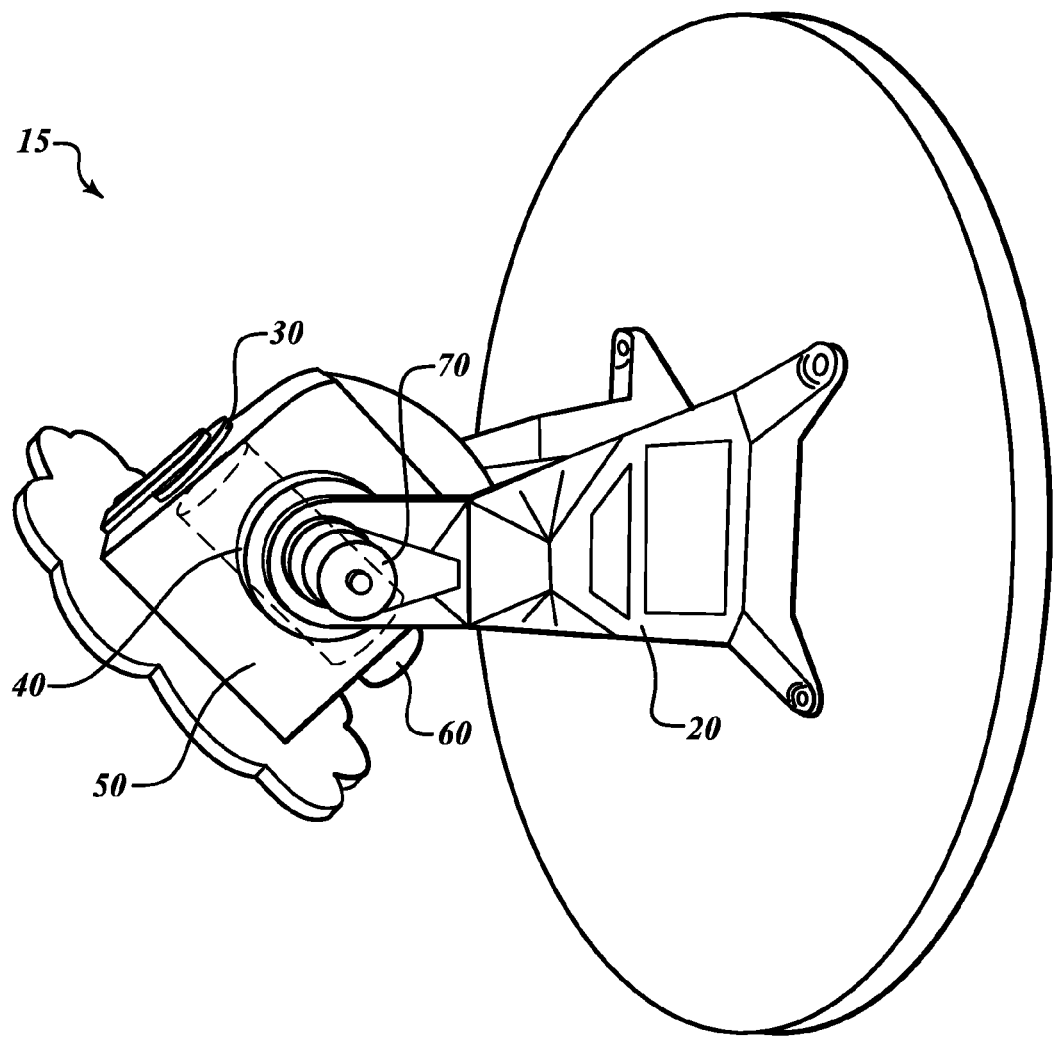
FIG. 2 illustrates an approach to calibrating a dual-axis radar-scanning assembly according to an embodiment of the invention.

Referring to FIG. 2, illustrated is an approach, according to an embodiment, to calibrating a dual-axis radar-scanning assembly 15, similar to assembly 10 illustrated in FIG. 1, in which like elements are designated by like reference numerals.

Figure 3:
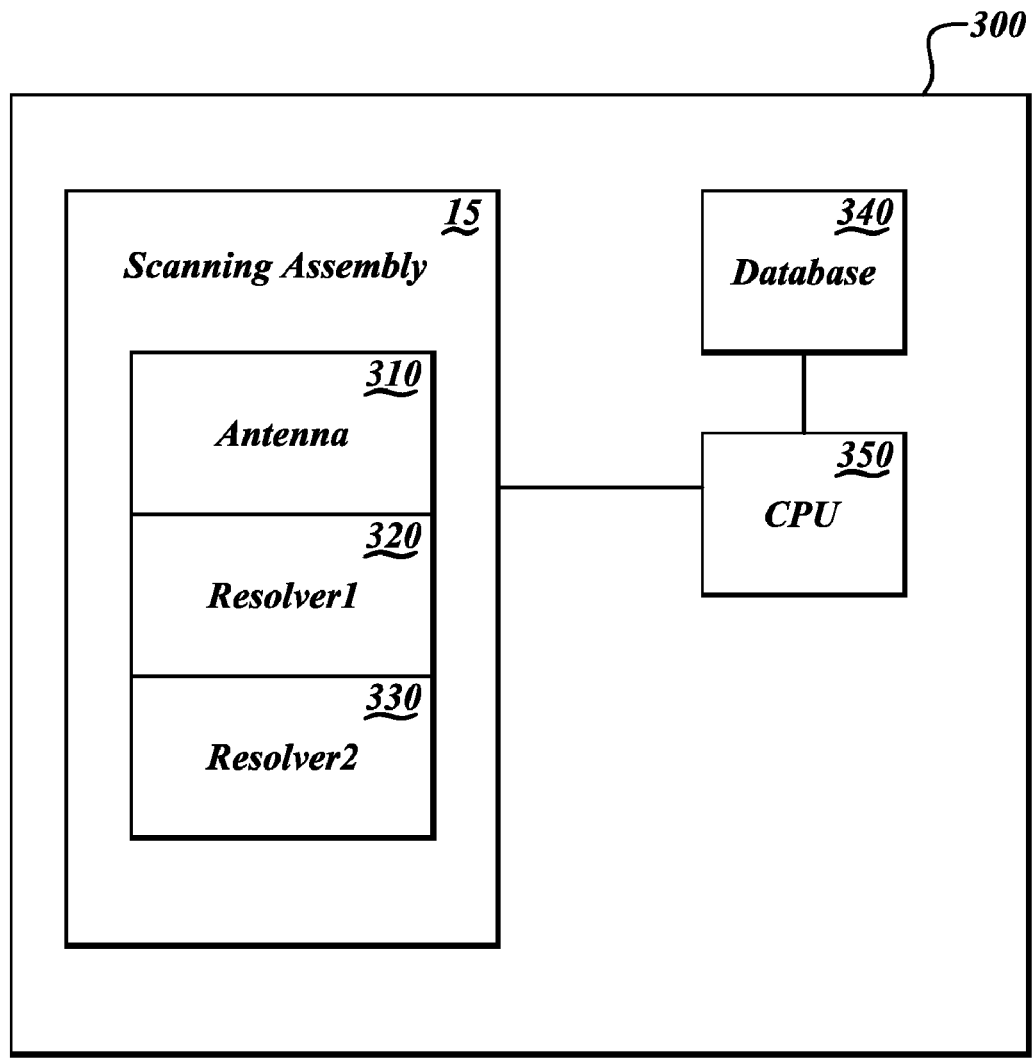
FIG. 3 illustrates a radar system according to an embodiment.

The approach illustrated in FIG. 2 includes calibrating antenna-position detection associated with the assembly 15, which is to be part of a radar system 300 (FIG. 3). The first and second gimbals 30, 40 are configured to rotate through a respective range of angular positions. Angle sensors associated with the assembly 15, such as resolvers 320, 330 (FIG. 3), are configured to detect the angular positions of the first and second gimbals 30, 40.

The illustrated approach includes mounting high-precision angle sensors, such as optical-encoder sensors 60, 70, to end portions of the first gimbal 30 and second gimbal 40, respectively. The encoder sensors 60, 70 are configured to detect respective angular positions of the first and second gimbals 30, 40. The optical encoders 60, 70, and associated components, employed in an embodiment may include, or be similar in functionality to, the sensor system having model number L-9517-9155-02A produced by RENISHAW®. In the illustrated embodiment, a sensor-ring portion of the encoder sensors 60, 70 are mounted onto respective ones of the axes of the end portions of first and second gimbals 30, 40.

During the calibration process according to an embodiment, each of the first and second gimbals 30, 40 are rotated through a predetermined set of angular positions. As the first and second gimbals 30, 40 are rotated, first data sets are generated by the resolvers 320, 330 that characterize the detected angular position of the first and second gimbals 30, 40 at each angular position through which they are rotated. At the same time, second data sets are generated by the encoder sensors 60, 70 that characterize the detected angular position of the first and second gimbals 30, 40 at each angular position through which they are rotated.

These first and second data sets are provided to a processing device (not shown) that is configured to determine a third data set characterizing errors in the angular-position measurements provided by the resolvers 320, 330 as determined from the measurements provided by the encoder sensors 60, 70. As such, these errors may be characterized as the differences, between the first data set and second data set, in detected angular position at each angular position through which the first and second gimbals 30, 40 are rotated. As discussed in greater detail below, the third data set is subsequently stored in a memory device, such as a database 340 (FIG. 3) onboard an aircraft or other vehicle in which the assembly 15 will be deployed.

Referring now to FIG. 3, illustrated is a radar system 300, according to an embodiment. The radar system 300 includes the scanning assembly 15 illustrated in FIG. 2, not including the encoder sensors 60, 70. The system 300 includes an antenna element 310 mounted to the first and second gimbals 30, 40, the database 340, and a processing element 350.

In operation, the database 340, after the calibration process described with reference to FIG. 2, includes the third data set characterizing errors in the angular-position measurements provided by the resolvers 320, 330 as determined from the measurements provided by the encoder sensors 60, 70. As the assembly 15 moves through its scanning arcs, the processing element 350 receives from the resolvers 320, 330 detected angular positions of the first and second gimbals 30, 40. Based on the third data set, the processing element 350 determines corrected, and more accurate, angular positions of the first and second gimbals 30, 40. These error-compensated determinations are then provided by the processing element 350 to weather-monitoring avionics/electronics (not shown), or the like, aboard the aircraft or other vehicle in which the illustrated system 300 is implemented.

Figure 4:
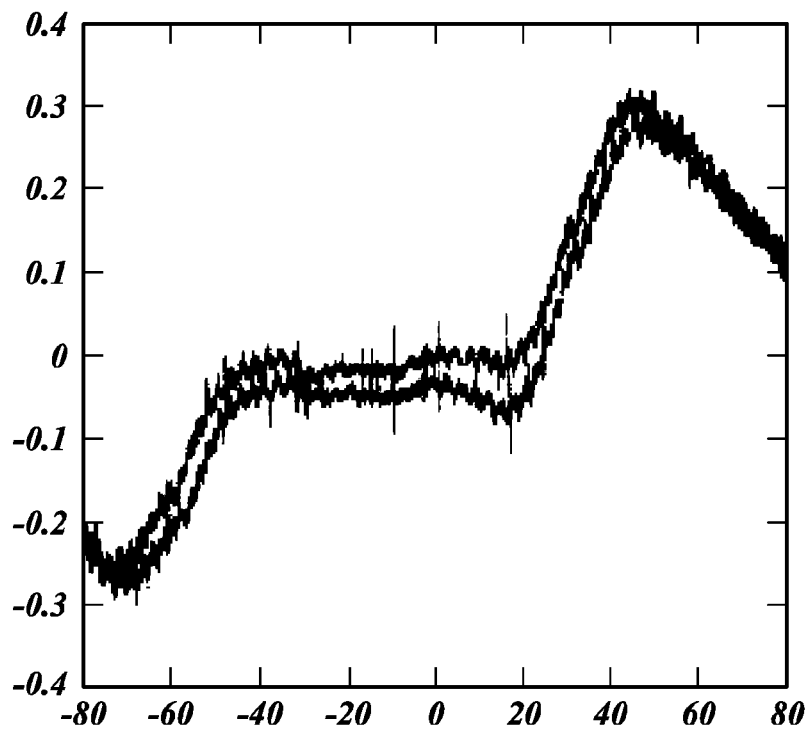
FIGS. 4-7 illustrate the effect of the calibration procedure of an embodiment on a radar system.
Figure 5:
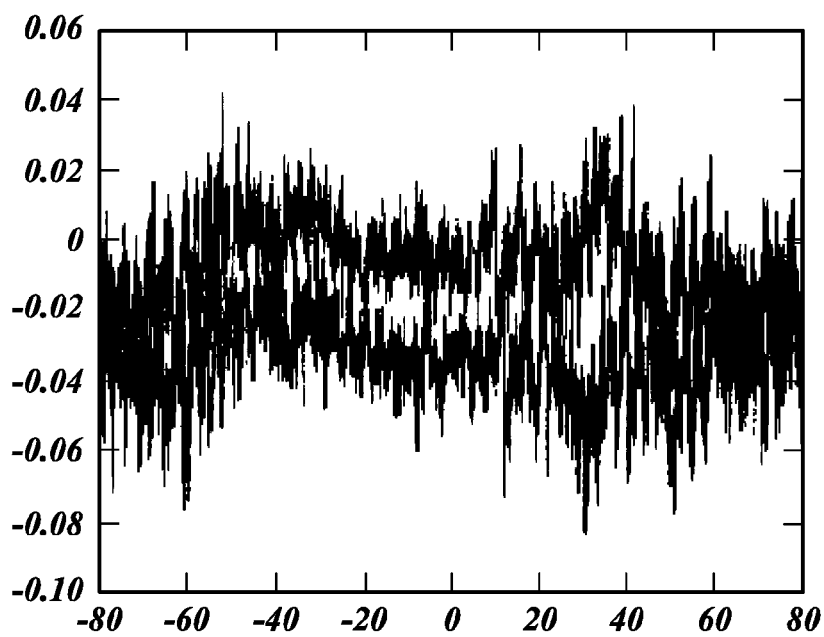
Figure 6:
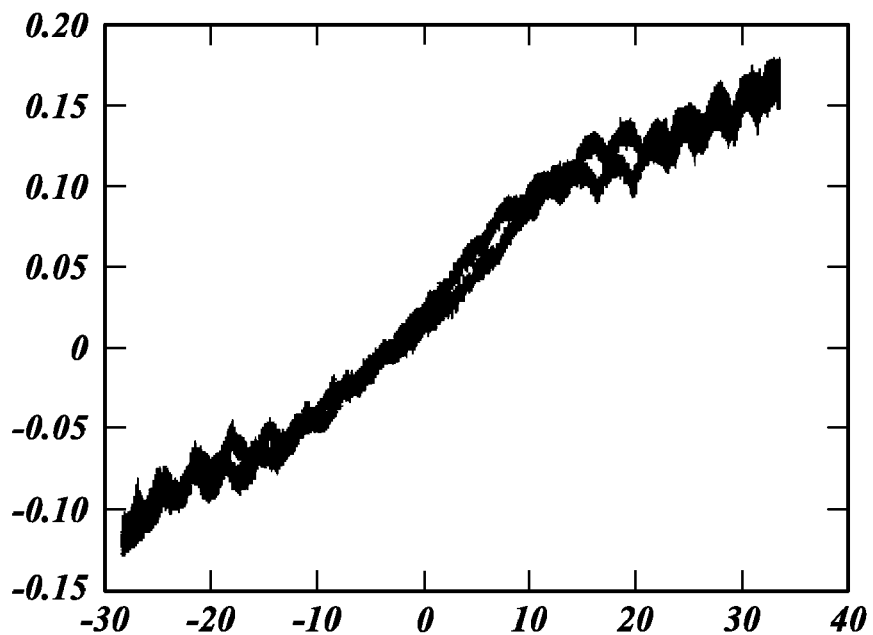
Figure 7:
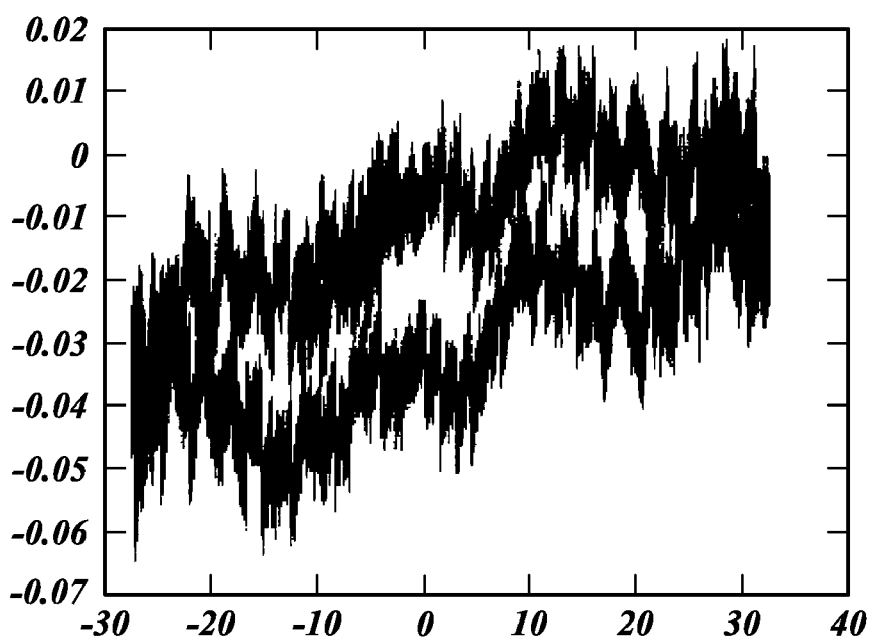

FIGS. 4-7 illustrate the effect of the herein-described calibration procedure of an embodiment on a radar system. FIGS. 4-5 show the azimuth-axis effect and FIGS. 6-7 show the elevation-axis effect. The openings are due to latencies in the reporting path and the speed of the antenna commanded. As can be seen from FIG. 4, the error before optical calibration (zero-point calibration with the digital protractor only) is ±0.3°; as shown in FIG. 5, after optical calibration (zero-point cal+optical encoder protocol) the azimuth error is reduced to ±0.07°. The elevation error is similarly affected: as can be seen from FIG. 6, before high-resolution calibration, the error is ±0.17°; as shown in FIG. 7, after high-resolution calibration, the error is ±0.06°.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of calibrating antenna-position detection associated with a radar system, the radar system including a first gimbal configured to rotate through a range of angular positions and to which an antenna element is coupled, and a first angle sensor configured to detect an angular position of the first gimbal, the method comprising the steps of:
   mounting a second angle sensor to the first gimbal, the second angle sensor configured to detect an angular position of the first gimbal;
   rotating the first gimbal through each angular position of a predetermined set of the angular positions;
   generating a first set of data with the first angle sensor characterizing a detected angular position of the first gimbal at each angular position through which the first gimbal is rotated;
   generating a second set of data with the second angle sensor characterizing a detected angular position of the first gimbal at each angular position through which the first gimbal is rotated;
   determining, with a processing device, a third data set comprising differences, between the first data set and second data set, in detected angular position at each angular position through which the first gimbal is rotated; and
   storing the third data set in a memory device electronically coupled to the first angle sensor.

2. The method of claim 1, wherein the first angle sensor comprises a resolver.

3. The method of claim 1, wherein the second angle sensor comprises an optical encoder.

4. The method of claim 1, wherein the second angle sensor has a higher accuracy rating than the first angle sensor.

5. The method of claim 1, wherein the first gimbal comprises an end portion, and the second angle sensor is mounted to the end portion.

6. The method of claim 1, wherein the radar system comprises the memory device.

7. The method of claim 1, wherein the first gimbal is configured to rotate about a first axis having a first orientation, the radar system further comprises a second gimbal configured to rotate through a range of angular positions and to which the antenna element is coupled, the second gimbal rotating about a second axis having a second orientation different from the first orientation, the radar system further comprises a third angle sensor configured to detect an angular position of the second gimbal, and the method further comprises:
   mounting a fourth angle sensor to the second gimbal, the fourth angle sensor configured to detect an angular position of the second gimbal;
   rotating the second gimbal through each angular position of a predetermined set of the angular positions;
   generating a fourth set of data with the third angle sensor characterizing a detected angular position of the second gimbal at each angular position through which the second gimbal is rotated;
   generating a fifth set of data with the fourth angle sensor characterizing a detected angular position of the second gimbal at each angular position through which the second gimbal is rotated;
   determining, with the processing device, a sixth data set comprising differences, between the fourth data set and fifth data set, in detected angular position at each angular position through which the second gimbal is rotated; and
   storing the sixth data set in the memory device.

8. A radar system, the radar system comprising:
   a first gimbal configured to rotate through a range of angular positions;
   an antenna element coupled to the first gimbal;
   a first angle sensor configured to detect an angular position of the first gimbal;
   a memory device including a third data set comprising differences, between a first data set and a second data set, in detected angular position at each angular position of a predetermined set of angular positions through which the first gimbal is rotated, the first data set being generated with the first angle sensor and characterizing a detected angular position of the first gimbal at each angular position through which the first gimbal is rotated, the second data set being generated with a second angle sensor characterizing a detected angular position of the first gimbal at each angular position through which the first gimbal is rotated; and a processing element configured to receive from the first angle sensor a detected angular position of the first gimbal, and determine, based on the third data set, a corrected angular position of the first gimbal.

9. The system of claim 8, wherein the first angle sensor comprises a resolver.

10. The system of claim 8, wherein the second angle sensor comprises an optical encoder.

11. The system of claim 8, wherein the second angle sensor has a higher accuracy rating than the first angle sensor.

12. The system of claim 8, wherein the first gimbal comprises an end portion, and the second angle sensor is mounted to the end portion.

13. The system of claim 8, wherein the first gimbal is configured to rotate about a first axis having a first orientation, the system further comprising:

a second gimbal configured to rotate through a range of angular positions and to which the antenna element is coupled, the second gimbal rotating about a second axis having a second orientation different from the first orientation; and a third angle sensor configured to detect an angular position of the second gimbal, wherein the memory device further includes a sixth data set comprising differences, between a fourth data set and a fifth data set, in detected angular position at each angular position of a predetermined set of angular positions through which the second gimbal is rotated, the fourth data set being generated with the third angle sensor and characterizing a detected angular position of the second gimbal at each angular position through which the second gimbal is rotated, the fifth data set being generated with a fourth angle sensor characterizing a detected angular position of the second gimbal at each angular position through which the second gimbal is rotated, and the processing element is further configured to receive from the third angle sensor a detected angular position of the second gimbal, and determine, based on the sixth data set, a corrected angular position of the second gimbal.

* * * * *